United States Patent
Sachdev et al.

(10) Patent No.: US 10,037,388 B2
(45) Date of Patent: Jul. 31, 2018

(54) FAST QUERYING OF SOCIAL NETWORK DATA

(71) Applicant: LinkedIn Corporation, Mountain View, CA (US)

(72) Inventors: Sanjay Sachdev, San Jose, CA (US); Jane Alam Jan, Santa Clara, CA (US); SungJu Cho, Cupertino, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 386 days.

(21) Appl. No.: 14/696,821

(22) Filed: Apr. 27, 2015

(65) Prior Publication Data
US 2016/0314220 A1    Oct. 27, 2016

(51) Int. Cl.
*G06F 17/30* (2006.01)

(52) U.S. Cl.
CPC .. *G06F 17/30958* (2013.01); *G06F 17/30917* (2013.01); *G06F 17/30991* (2013.01)

(58) Field of Classification Search
CPC ......... G06F 17/30598; G06F 17/30917; G06F 17/30991
USPC ...................................................... 707/798
See application file for complete search history.

(56) References Cited

U.S. PATENT DOCUMENTS 9,350,661 B2 * 5/2016 Murphy .................. H04L 47/12
9,454,599 B2 * 9/2016 Golden ............. G06F 17/30651
2006/0004623 A1 * 1/2006 Jasti ...................... G06F 19/327 705/80
2008/0034074 A1 * 2/2008 Becker ................. G06K 9/6224 709/223
2008/0243770 A1 * 10/2008 Aasman ............ G06F 17/30587
2010/0153404 A1 * 6/2010 Ghosh ............... G06F 17/30699 707/748
2012/0173845 A1 * 7/2012 Venkataramani ... G06F 17/3048 711/216
2012/0215785 A1 * 8/2012 Singh ................ G06F 17/30867 707/741
2013/0124538 A1 * 5/2013 Lee ...................... G06F 17/3053 707/749
2013/0290226 A1 * 10/2013 Dokken .................... G06N 5/02 706/12
2014/0122473 A1 * 5/2014 Fletcher ............... G06Q 10/101 707/732
2016/0092584 A1 * 3/2016 Nigam .............. G06F 17/30958 707/741

* cited by examiner

*Primary Examiner* — Miranda Le
(74) *Attorney, Agent, or Firm* — Park, Vaughan, Fleming & Dowler LLP; Chia-Hsin Suen

(57) ABSTRACT

The disclosed embodiments provide a system for processing data. During operation, the system obtains a graph of a social network, wherein the graph includes a set of nodes representing users in the social network and a set of edges representing relationships between pairs of the users. Next, the system stores, on a single computer system, a static representation of the graph, wherein the static representation includes a first set of fixed-size blocks representing the nodes and the edges and a first index that maps a set of identifiers for the nodes and the edges to offsets of the first set of fixed-size blocks. The system then uses the static representation of the graph to process, by the single computer system, one or more queries of the graph.

20 Claims, 6 Drawing Sheets

FAST QUERYING OF SOCIAL NETWORK DATA

BACKGROUND

Field

The disclosed embodiments relate to techniques for querying social network data. More specifically, the disclosed embodiments relate to techniques for performing fast querying of social network data.

Related Art

Social networks may include nodes representing individuals and/or organizations, along with links between pairs of nodes that represent different types and/or levels of social familiarity between the nodes. For example, two people represented by nodes in a social network may be connected as friends, acquaintances, family members, and/or professional contacts. Social networks may further be tracked and/or maintained on web-based social networking services, such as online professional networks that allow the individuals and/or organizations to establish and maintain professional connections, list work and community experience, endorse and/or recommend one another, run advertising and marketing campaigns, promote products and/or services, and/or search and apply for jobs.

In turn, social networks and/or online professional networks may facilitate business activities such as sales, marketing, and/or recruiting by the individuals and/or organizations. For example, sales professionals may use an online professional network to locate prospects, maintain a professional image, establish and maintain relationships, and/or engage with other individuals and organizations. To fully leverage the online professional network in conducting business activities, the individuals and/or organizations may perform complex queries of the online professional network. For example, a sales professional may identify sales prospects by searching the online professional network for a chain of individuals and/or organizations that can be used to connect the sales professional to the sales prospects.

However, complex querying of social and/or online professional network data may be time- and/or resource-intensive. For example, a query that finds possible paths between two nodes in the online professional network may require a scan of all links between individuals and/or organizations that may be used to form a path connecting the nodes, with the number of links to be scanned increasing exponentially with the number of hops in the path. Moreover, a subset of the individuals and/or organizations may have a significantly larger than average number of links to other individuals and/or organizations, resulting in the added consumption of computational resources and/or time during execution of the query if the subset of individuals and/or organizations is included in the search space of the query.

Consequently, querying of social and/or online professional networks may be facilitated by mechanisms for improving the performance of complex queries of social and/or online professional network data.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
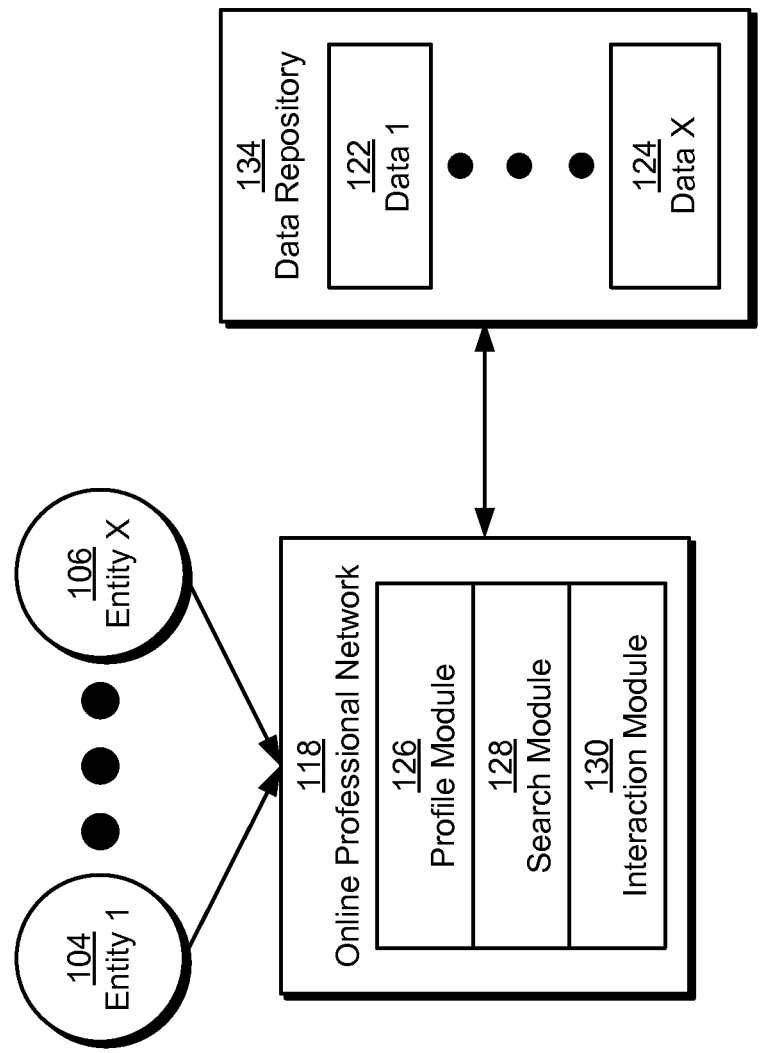
FIG. 1 shows a schematic of a system in accordance with the disclosed embodiments.

The disclosed embodiments provide a method and system for processing data. More specifically, the disclosed embodiments provide a method and system for facilitating the processing of queries of social network data. As shown in FIG. 1, the social network data may be associated with an online professional network 118 that is used by a set of entities (e.g., entity 1 104, entity x 106) to interact with one another in a professional and/or business context.

For example, the entities may include users that use online professional network 118 to establish and maintain professional connections, list work and community experience, endorse and/or recommend one another, search and apply for jobs, and/or perform other actions. The entities may also include companies, employers, and/or recruiters that use online professional network 118 to list jobs, search for potential candidates, provide business-related updates to users, advertise, and/or take other action.

The entities may use a profile module 126 in online professional network 118 to create and edit profiles containing information related to the entities' professional and/or industry backgrounds, experiences, summaries, projects, skills, and so on. Profile module 126 may also allow the entities to view the profiles of other entities in online professional network 118.

Next, the entities may use a search module 128 to search online professional network 118 for people, companies, jobs, and/or other job- or business-related information. For example, the entities may input one or more keywords into a search bar to find profiles, job postings, articles, and/or other information that includes and/or otherwise matches the keyword(s). The entities may additionally use an "Advanced Search" feature on online professional network 118 to search for profiles, jobs, and/or information by categories such as first name, last name, title, company, school, location, interests, relationship, industry, groups, salary, experience level, etc.

The entities may also use an interaction module 130 to interact with other entities on online professional network 118. For example, interaction module 130 may allow an entity to add other entities as connections, follow other entities, exchange messages with other entities, join groups, and/or interact with (e.g., create, share, re-share, like, and/or comment on) posts from other entities.

Those skilled in the art will appreciate that online professional network 118 may include other components and/or modules. For example, online professional network 118 may include a homepage, landing page, and/or content feed that provides the latest postings, articles, and/or updates from the entities' connections and/or groups to the entities. Similarly, online professional network 118 may include mechanisms for recommending connections, job postings, articles, and/or groups to the entities.

In one or more embodiments, data (e.g., data 1 122, data x 124) related to the entities' profiles and activities on online professional network 118 is aggregated into a data repository 134 for subsequent retrieval and use. For example, each profile update, profile view, connection, follow, post, comment, like, share, search, click, message, interaction with a group, and/or other action performed by an entity in online professional network 118 may be tracked and stored in a database, data warehouse, cloud storage, and/or other data-storage mechanism providing data repository 134.

Figure 2:
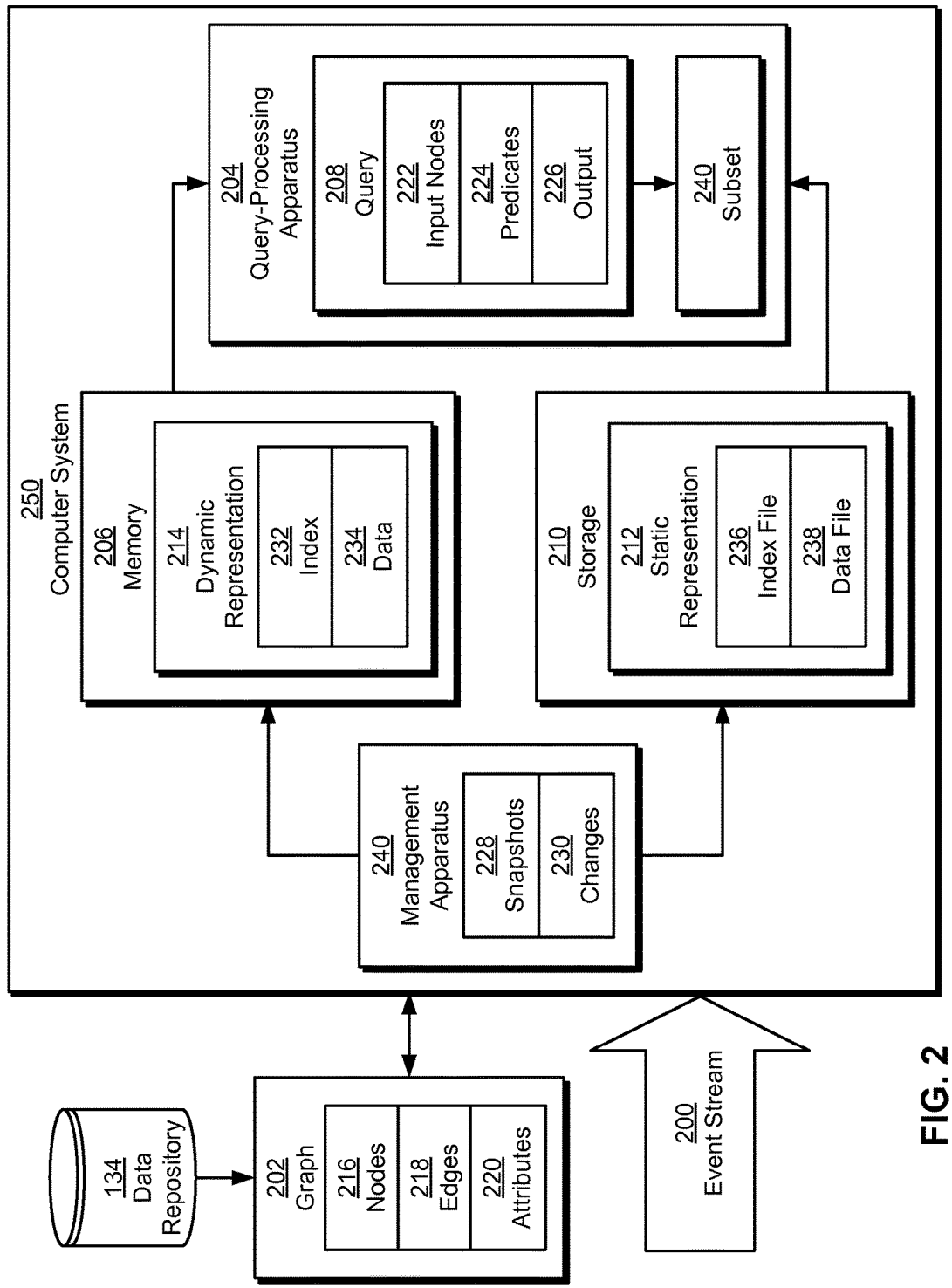
FIG. 2 shows a system for processing data in accordance with the disclosed embodiments.

As shown in FIG. 2, data in data repository 134 and/or another primary data store may be used to form a graph 202 of online professional network data representing entities and the entities' relationships and/or activities in an online professional network, such as online professional network 118 of FIG. 1. Graph 202 may include a set of nodes 216, a set of edges 218, and a set of attributes 220.

Nodes 216 in graph 202 may represent entities in the online professional network. For example, the entities represented by nodes 216 may include individual members (e.g., users) of the online professional network, groups joined by the members, and/or organizations such as schools and companies. Nodes 216 may also represent other objects and/or data in the online professional network, such as skills, industries, locations, posts, articles, multimedia, job listings, positions, ads, and/or messages.

Edges 218 may represent relationships and/or interaction between pairs of nodes 216 in graph 202. For example, edges 218 may be directed and/or undirected edges that specify connections between pairs of members, education of members at schools, employment of members at organizations, business relationships and/or partnerships between organizations, residence of members at locations, or some other relationship. Edges 218 may also indicate actions taken by entities, such as creating or sharing articles or posts, sending messages, connection requests, listing skills, joining groups, following other entities, or some other action.

Nodes 216 and edges 218 may also contain attributes 220 that describe the corresponding entities, objects, associations, and/or relationships in the online professional network. For example, a node representing a member may include attributes 220 such as a name, username, password, email address, etc. Similarly, an edge representing a connection between the member and another member may have attributes 220 such as a time at which the connection was made, the type of connection (e.g., friend, colleague, classmate, etc.), a strength of the connection (e.g., how well the members know one another), etc.

Online professional network data in graph 202 may be accessed through a query-processing apparatus 204. For example, query-processing apparatus 204 may be used to read and write data in graph 202 during use of the online professional network by a set of users. Query-processing apparatus 204 may read from graph 202 during loading of profiles, job postings, articles, search results, and/or other online professional network data from data repository 134 in a website and/or application for accessing the online professional network. Query-processing apparatus 204 may write to graph 202 to update graph 202 with recent activity and/or information such as a new job posting, profile update, connection, article, comment, like, and/or share.

To obtain data from graph 202, a query 208 may be submitted to query-processing apparatus 204, and query-processing apparatus 204 may process query 208 by scanning graph 202 for one or more nodes 216, edges 218, and/or attributes 220 matching query 208. For example, a user may use a search module (e.g., search module 128 of FIG. 1) to create and submit query 208 to query-processing apparatus 204. Query-processing apparatus 204 may obtain one or more keywords and/or categories from query 208 and search graph 202 for a subset 240 of nodes 216, edges 218, attributes 220, and/or other online professional network data matching query 208. Query-processing apparatus 204 may then provide subset 240 in response to query 208 by displaying subset 240 within a user interface of the online professional network (e.g., the search module) and/or outputting subset 240 to a file.

In one or more embodiments, query-processing apparatus 204 includes functionality for performing complex querying of online professional network data in graph 202, such as querying that involves two or more hops in graph 202. For example, query-processing apparatus 204 may support searching of three- or four-hop paths in graph 202 for members, schools, and/or companies that can be used to connect two members in the online professional network.

As shown in FIG. 2, query 208 may be a complex query containing one or more input nodes 222, one or more predicates 224, and an output 226. Input nodes 222 may include one or more nodes 216 from graph 202. For example, input nodes 222 may include members, companies, schools, groups, and/or other nodes. Predicates 224 may include filters that restrict the possible values of one or more attributes 220 in subset 240. For example, query 208 may include a predicate for employment of a member at a specific company and/or employment of two or more members at the same company at the same time. In another example, query 208 may include an exact match and/or a range of values for an attribute such as dates of employment, dates of education, name, industry, etc. In a third example, query 208 may include a predicate that specifies the separation of two members by a minimum number of hops in graph 202 and/or a minimum connection strength of edges in a path connecting the members. Output 226 may specify one or more nodes 216, edges 218, and/or attributes 220 that match predicates 224. For example, output 226 may include one or more members that are related, directly or indirectly, to input nodes 222 and match the filters specified in predicates 224.

Those skilled in the art will appreciate that execution of query 208 and/or other complex queries of graph 202 may require significantly more time and/or computational resources than simpler queries that contain two or fewer hops in graph 202. For example, a query (e.g., query 208) that finds all possible paths between two nodes in the online professional network may require a scan of all edges that may be used to form a path connecting the nodes. The number of edges to be scanned may increase exponentially with the number of hops in the query, thus effectively limiting the number of hops that can be searched in a reasonable amount of time for a given amount of processor time and/or memory usage.

Mechanisms used to store and/or process reads and writes of graph 202 may further contribute to latency associated with querying of graph 202. For example, graph 202 may typically be stored in a number of redundant clusters to enable scaling associated with storing, querying, and/or indexing graph 202 as the use of the online professional network increases. Within a given cluster, graph 202 may be sharded across multiple machines in the cluster, so that each machine is responsible for serving a different subset of graph 202. To process a complex query such as a query for a second-degree network of a member (e.g., all members that are up to two degrees of separation from an input member), a list of members to which the member is directly connected may be retrieved from one machine. Next, a number of additional machines in the cluster may be queried for members that are directly connected to the members in the list. Because multiple machines are required to execute the query, limited network bandwidth in the cluster and/or bottlenecks in the machines may interfere with the timely generation of results in response to the query. Consequently, latency associated with querying social network data may increase proportionally to both the number of nodes and/or edges to be queried and number of computational nodes required to perform the querying.

In one or more embodiments, the system of FIG. 2 includes functionality to reduce latency associated with processing of queries of graph 202. As shown in FIG. 2, the system may be provided by a single computer system 250 instead of multiple machines in a cluster or other distributed system. The system includes query-processing apparatus 204 and a management apparatus 240, both of which are described in further detail below.

Management apparatus 240 may maintain and update a representation of graph 202 on computer system 202. The representation may be obtained as one or more snapshots 228 from data repository 134, a primary data store, and/or another "source of truth." For example, management apparatus 240 may obtain snapshots 228 of graph 202 as snapshots 228 are periodically made available in data repository 134 (e.g., after the snapshots are generated by another data-processing mechanism).

Conversely, management apparatus 240 may use computer system 250 as a primary data store for graph 202 and update a local version of graph 202 in response to changes 230 to graph 202 from an event stream 200. For example, management apparatus 240 may receive records of changes 230 to nodes 216, edges 218, attributes 220, and/or other parts of graph 202 as user actions associated with changes 230 are detected by a service associated with the online professional network and propagated in event stream 200.

More specifically, management apparatus 240 may store a static representation 212 of graph 202 in storage 210 on computer system 250. For example, management apparatus 240 may persist static representation 212 in one or more hard disk drives (HDD), solid-state drives (SSDs), non-volatile memory devices, and/or other data storage devices in computer system 250. Static representation 212 may include an index file 236 and a data file 238.

Data file 238 may contain a set of fixed-size blocks representing nodes 216 and/or edges 218. For example, data file 238 may store all edges 218 in graph 202 in a compact binary format within contiguous fixed-size blocks. Within the fixed-size blocks, edges 218 may be stored using adjacency lists that are sorted by destination. For example, the connections of a member may be stored in a block with the member's identifier as the index, along with a set of attributes 220 (e.g., identifiers of the member's connections, connection types, connection strengths, times of creation, etc.) that define the connections. The entire adjacency list of a given node may be stored in one or more fixed-size blocks and returned with a single lookup.

Index file 236 may map identifiers for nodes 216 and/or edges 218 to offsets in data file 238. For example, index file 236 may include an array of integer-sized data elements. Positions of data elements in the array may represent numeric identifiers for nodes 216 and/or edges 218 in graph 202, so that the identifiers are contiguous numbers that range from one to the number of nodes 216 and/or edges 218 in graph 202. Each data element may store a value representing the offset in data file 238 of data for the corresponding node or edge. If data for nodes 216 or edges 218 in graph 202 can span multiple blocks, the data element may also store a value representing the number of bytes or blocks occupied by the data.

Query-processing apparatus 204 may use static representation 212 to process query 208 and/or other queries of graph 202. Continuing with the above example, query-processing apparatus 204 may perform a lookup of data for a node or edge in graph 202 by obtaining the offset and/or size of the data from the position in index file 236 that represents the numeric identifier for the node or edge and retrieving the data from the offset in data file 238.

Those skilled in the art will appreciate that processing of queries may require the reading of data from storage 210 into memory 206. To retrieve data from data file 238 in response to a query, management apparatus 240 and/or another component of computer system 250 may transfer a page of data file 238 into memory 206. If not enough memory 206 is available for the transfer, the component may be required to evict a page from memory 206 to make room for the transfer. If the evicted page is then requested during processing of a subsequent query, the component may be required to perform another page swap. In turn, such frequent page swapping on computer system 250 may increase the latency of processing queries of graph 202.

To mitigate excessive page swaps in computer system 250, data in data file 238 may be grouped by the activity level of users associated with the corresponding nodes 216 and/or edges 218. For example, records of activity from event stream 200 and/or graph 202 may be used to identify users who are currently active on the online professional network. Data associated with the active users from graph 202 may then be stored in a subset of contiguous fixed-size blocks in data file 238. Such grouping of blocks for active users into contiguous regions may be performed by management apparatus 240, the creator of snapshots 228, and/or another component. The data may then be read as one or more contiguous pages into memory 206 to service queries associated with the users' activity. Once the data is in memory 206, subsequent requests associated with the same set of users may be processed directly from memory 206, thus averting additional page swaps.

To track changes 230 made to graph 202 since the creation of static representation 212, management apparatus 240 may maintain a dynamic representation 214 of changes 230 in memory 206. For example, management apparatus 240 may obtain changes 230 from event stream 200 in real-time or near-real-time and update binary representations of graph 202 in memory 206 based on changes 230.

Like index file 236 and data file 238 of static representation 212, dynamic representation 214 may include an index 232 and data 234. Data 234 may be stored in fixed-size blocks in memory in the same binary format as data in data file 238. As a result, fixed-size blocks of data (e.g., data 234) may be transferred between memory 206 and storage 210 and returned in response to queries without additional processing by management apparatus 240, query-processing apparatus 204, and/or another component of computer system 250.

Index 232 may include a mapping of identifiers of one or more nodes 216 and/or edges 218 associated with changes 230. For example, index 232 may be implemented as a concurrent hash map of key-value pairs, with the key set to the identifier of a component (e.g., node or edge) of graph 202 and the value set to the offset of one or more fixed-size blocks of data 234 for the component in dynamic representation 214.

To apply a change to graph 202, management apparatus 240 may transfer one or more fixed-size blocks associated with the change from data file 238 in storage 210 to data 234 in memory 206 and update index 232 with the offsets of the blocks in data 234. Alternatively, the blocks and corresponding mappings may already be in data 234 and index 232 if the blocks were previously read from storage 210 during processing of other queries. For example, the blocks may already be in memory 206 if the blocks were previously retrieved from storage 210 during processing of queries associated with active users.

Once the blocks are in memory 206, management apparatus 240 may write the change to the blocks. For example, management apparatus 240 may update a block of data for a member's connections with a newly made connection to another member by adding the identifier of the other member and/or one or more attributes 220 of the newly made connection to the block. Subsequent queries of the member's connections may then be processed using the block in dynamic representation 214 on memory 206 instead of an older version of the block in static representation 212 on storage 210.

In general, query-processing apparatus 204 may use both dynamic representation 214 and static representation 212 to process queries (e.g., query 208) of graph 202. First, query-processing apparatus 204 may search dynamic representation 214 for a subset of graph 202 (e.g., one or more nodes 216 and/or edges 218) that matches each query. If the subset is found in dynamic representation 214, query-processing apparatus 204 may provide the subset from dynamic representation 214 in response to the query. For example, query-processing apparatus 204 may use index 232 to match an identifier in the query to a mapping in index 232 and one or more fixed-size blocks in data 234. Query-processing apparatus 204 may then return the fixed-size blocks in the result set of the query.

If the subset is not found in dynamic representation 214, query-processing apparatus 204 may provide the subset from static representation 212 in response to the query. Continuing with the above example, query-processing apparatus 204 may fail to find the subset from dynamic representation 212 if index 232 does not contain the identifier from the query. Instead, query-processing apparatus 204 may match the identifier to the corresponding position of a data element in index file 236, use the value of the data element as an offset of the fixed-size blocks containing the subset in data file 238, and retrieve the fixed-size blocks from data file 238 in response to the query.

Index 232 and data 234 may be kept in memory 206 up to a pending restart of computer system 250. For example, computer system 250 may be restarted to perform maintenance or install new hardware or software. Before the restart is initiated, management apparatus 240 may store index 232 and data 234 in one or more files in storage 210. After computer system 250 is restarted, management apparatus 240 may load index 232 and data 234 from the stored file(s) into memory 206.

On the other hand, index 232 and data 234 may be discarded from both memory 206 and storage 210 after static representation 212 is replaced with a newer snapshot of graph 202 from data repository 134 and/or another primary data store. If a newer snapshot of graph 202 is available, management apparatus 240 may overwrite static representation 212 with the newer snapshot, which already contains changes tracked by dynamic representation 214. During the update of static representation 212, computer system 250 may be taken offline to prevent processing of queries. Once static representation 212 has been updated, management apparatus 240 may discard dynamic representation 214 and/or any files containing data from dynamic representation 214.

As mentioned above, computer system 250 may be used as the primary data store for graph 202 instead of as a mechanism for efficiently serving data duplicated from the primary data store. Thus, computer system 250 may periodically merge dynamic representation 214 into static representation 212 instead of replacing static representation 212 with a snapshot from another data source (e.g., data repository 134). To merge dynamic representation 214 into static representation 212, computer system 250 may use index 232 and index file 236 to locate corresponding blocks in data 234 and data file 238 and replace the blocks in data file 238 with newer versions of the blocks from data 234. After dynamic representation 214 is merged into static representation 212, dynamic representation 214 may be discarded to increase the availability of memory 206 in computer system 250. Alternatively, portions of dynamic representation 214 (e.g., nodes 216 and/or edges 218 associated with active users) may be kept in memory to enable subsequent processing of queries of the portions by query-processing apparatus 204.

Those skilled in the art will appreciate that the system of FIG. 2 may be implemented in a variety of ways. First, query-processing apparatus 204 and management apparatus 240 may be implemented together and/or separately by one or more hardware and/or software components and/or layers. The hardware and/or software components may also be selected to improve the execution of the system. For example, the latency of the system may be reduced by storing one or more portions of static representation 212 on one or more SSDs instead of HDDs and/or including sufficient memory 206 to accommodate the entirety of static representation 212 and the tracking of changes 230 to graph in dynamic representation 214.

Second, static representation 212 and dynamic representation 214 may be stored, formatted, and/or arranged in ways that facilitate efficient querying and updating of graph 202 in computer system 250. As mentioned above, data associated with nodes 216 and/or edges 218 may be stored in binary form in fixed-size blocks that can be transferred between storage 210 and memory 206 without modification. The fixed-size blocks may also occupy contiguous regions of memory 206 and storage 210 to reduce the amount of space consumed by static representation 212 and dynamic representation 214.

To further support querying of the entirety of graph 202 on a single computer system 250, fixed-size blocks in static representation 212 and dynamic representation 214 may omit information that is not necessary to reconstruct the structure of graph 202. For example, static representation 212 and dynamic representation 214 may include only edge types, edge directions, connection strengths, and/or other information related to connections among nodes 216 in graph 202. In turn, static representation 212 and dynamic representation 214 may omit additional information that is not relevant to determining and/or analyzing the structure of graph 202, such as profile data, usage statistics, and/or content. Instead, the additional information may be maintained in a different data store and accessed through other query-processing mechanisms. Alternatively, one or more portions of the additional information may be integrated into static representation 212 and/or dynamic representation 214 if the portion(s) can be accommodated by the computational and/or storage resources of computer system 250.

Third, multiple instances of query-processing apparatus 204, management apparatus 240, and/or computer system 250 may be provided to increase fault tolerance and/or facilitate scaling associated with storing, querying, and indexing graph 202 as the use of the online professional network increases. For example, a certain volume of queries of graph 202 may be handled by multiple (e.g., 10) instances of computer system 250, each containing a copy of graph 202, an instance of query-processing apparatus 204, and an instance of management apparatus 240.

Because queries to graph 202 are processed by a single computer system 250 instead of multiple computers in a cluster, the system of FIG. 2 may perform such processing with significantly less latency and higher throughput than a cluster-based query-processing system. As a result, the system of FIG. 2 may provide technical improvements in the querying of social network graphs and/or other types of graph-based data. The system of FIG. 2 may also be easier to deploy; consume fewer computational, network, and/or energy resources; and have fewer points of failure than a cluster.

Figure 3:
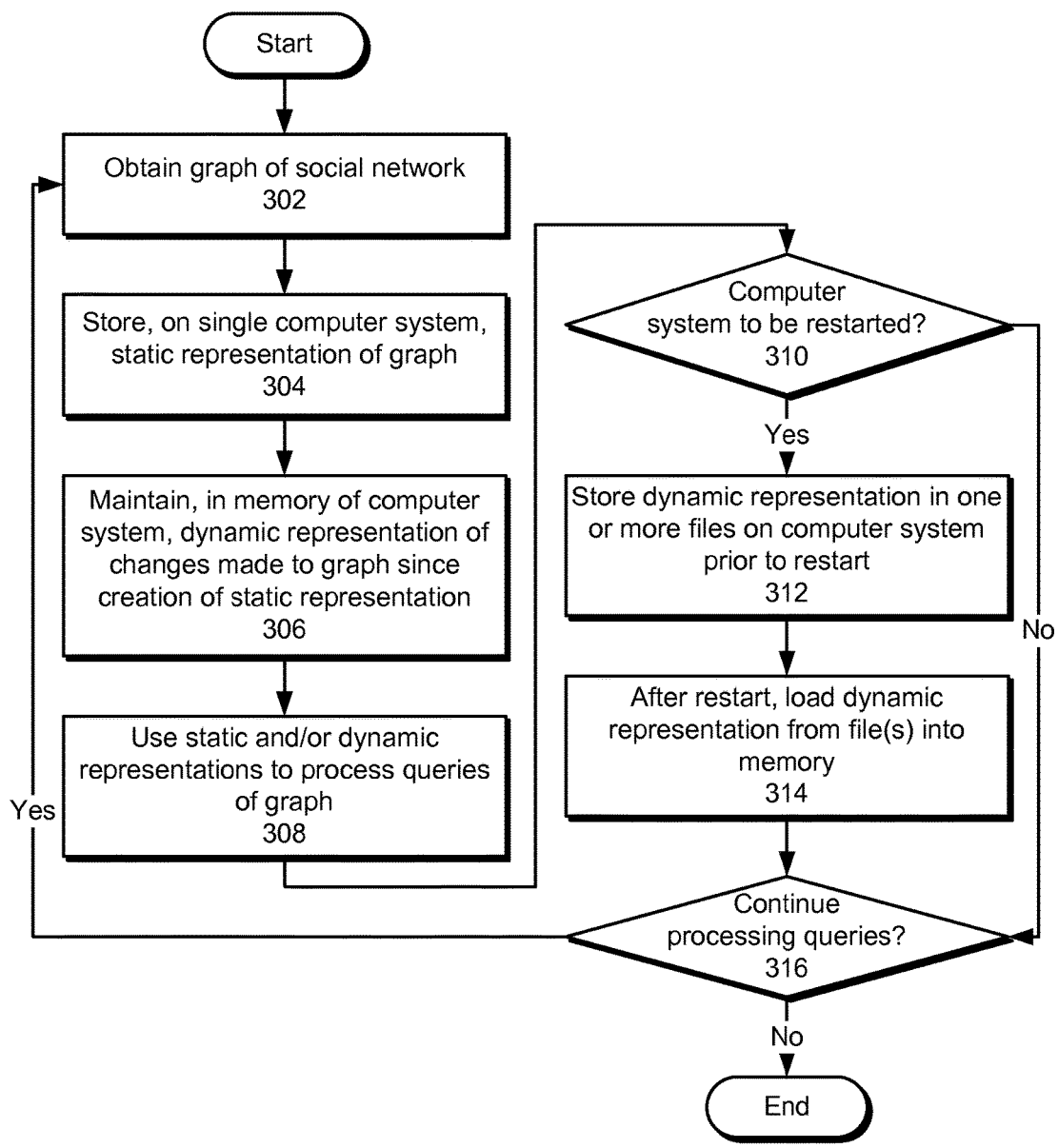
FIG. 3 shows a flowchart illustrating the processing of data in accordance with the disclosed embodiments.

FIG. 3 shows a flowchart illustrating the processing of data in accordance with the disclosed embodiments. In one or more embodiments, one or more of the steps may be omitted, repeated, and/or performed in a different order. Accordingly, the specific arrangement of steps shown in FIG. 3 should not be construed as limiting the scope of the embodiments.

First, a graph of a social network is obtained (operation 302). The graph may include a set of nodes representing members, companies, schools, and/or other entities in the social network, as well as a set of edges representing relationships between pairs of the users. The graph may be obtained from a primary data source such as a relational database.

Next, a static representation of the graph is stored on a single computer system (operation 304). For example, the static representation may be stored in one or more HDDs, SSDs, and/or other forms of non-volatile memory. The static representation may include a set of fixed-size blocks representing the nodes and/or edges, along with an index that maps identifiers for the nodes and/or edges to offsets of the fixed-size blocks. The set of fixed-size blocks may include a subset of contiguous fixed-size blocks associated with active users in the social network to reduce overhead associated with subsequent retrieval of data associated with the active users.

A dynamic representation of changes made to the graph since the creation of the static representation is also maintained in memory of the computer system (operation 306). The dynamic representation may include newer versions of fixed-size blocks from the static representation, as well as an index that maps a subset of identifiers for nodes and/or edges associated with the changes to the newer versions of the fixed-size blocks. The static and/or dynamic representations are then used to process queries of the graph (operation 308), as described in further detail below with respect to FIG. 4.

The computer system may be restarted (operation 310). If the computer system is to be restarted, the dynamic representation is stored in one or more files on the computer system (operation 312) before the restart. After the computer system is restarted, the dynamic representation is loaded from the file(s) into memory (operation 314). If the computer system is not restarted, the dynamic representation may continue to be maintained in memory until the static representation is updated or replaced.

Queries may continue to be processed (operation 316) by the computer system. If the queries are to be processed, a graph of the social network may be obtained from the computer system and/or another data source, as described in further detail below with respect to FIG. 5. Static and dynamic representations of the graph may be maintained on the computer system (operations 304-306), used to process queries (operation 308), and persisted across restarts of the computer system (operations 310-314). Processing of the queries by the computer system may continue until the computer system is no longer used to serve data from the graph.

Figure 4:
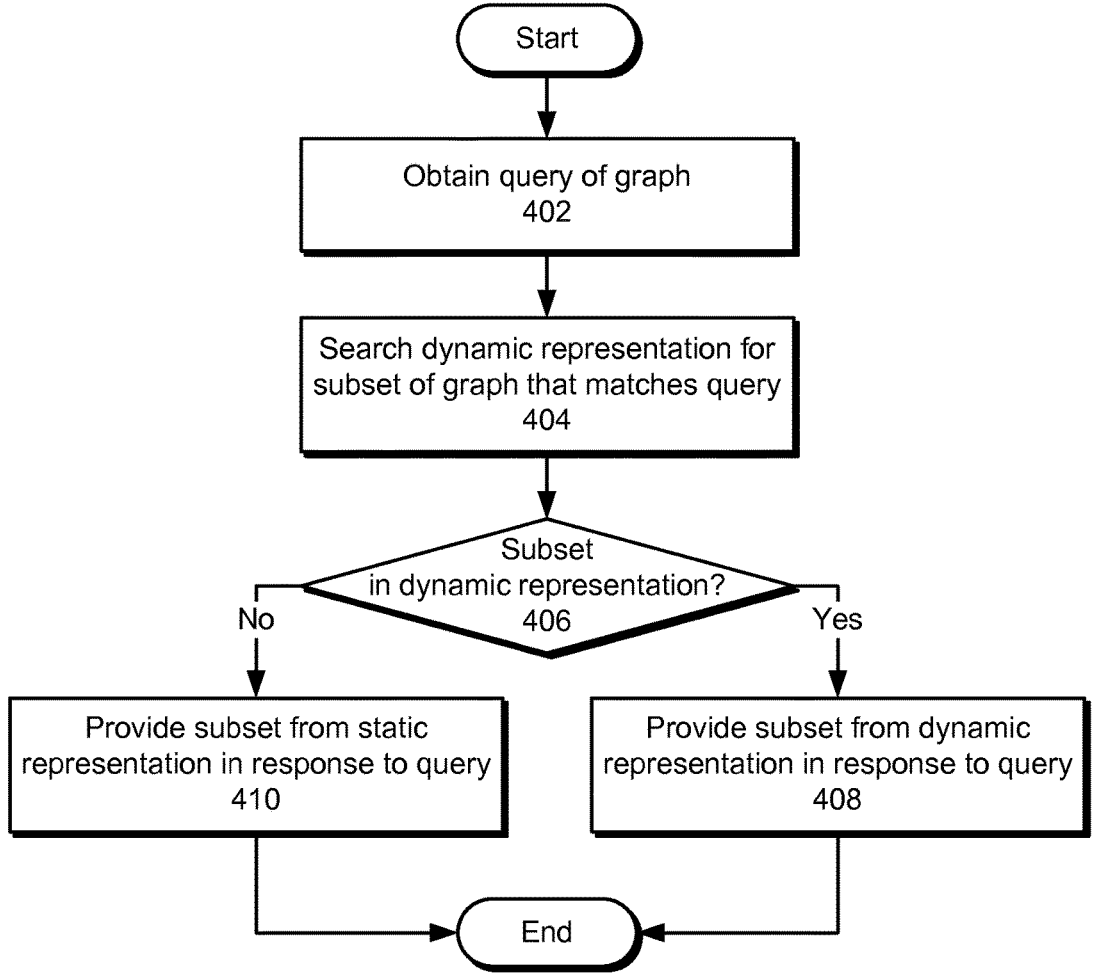
FIG. 4 shows a flowchart illustrating the processing of a query of a graph of a social network in accordance with the disclosed embodiments.

FIG. 4 shows a flowchart illustrating the processing of a query of a graph of a social network in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

First, the query is obtained (operation 402). For example, the query may be obtained as an analytics query and/or a query that is used to return data to a user during interaction with the social network. Next, a dynamic representation of changes made to the graph since the creation of a static representation of the graph is searched for a subset of the graph that matches the query (operation 404). For example, an index in the dynamic representation may be used to match an identifier in the query to an offset of one or more fixed-size blocks representing the subset in the dynamic representation.

The subset may be found in the dynamic representation (operation 406). For example, the subset may be in the dynamic representation if the index in the dynamic representation includes the identifier in the query. If the subset is found in the dynamic representation, the subset is provided from the dynamic representation in response to the query (operation 408). If the subset is not found in the dynamic representation, the subset is provided from the static representation in response to the query (operation 410).

Figure 5:
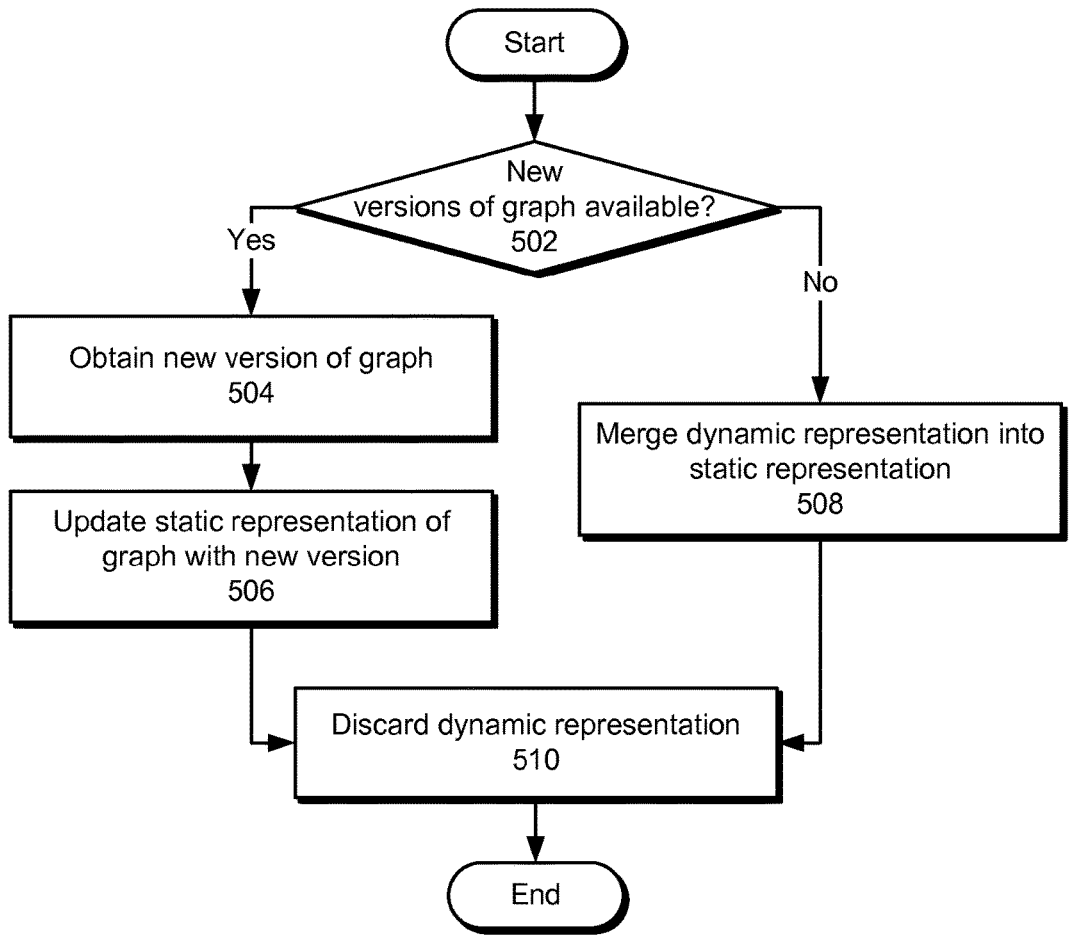
FIG. 5 shows a flowchart illustrating the process of updating a graph of a social network on a computer system in accordance with the disclosed embodiments.

FIG. 5 shows a flowchart illustrating the process of updating a graph of a social network on a computer system in accordance with the disclosed embodiments. In one or more embodiments, one or more of the steps may be omitted, repeated, and/or performed in a different order. Accordingly, the specific arrangement of steps shown in FIG. 5 should not be construed as limiting the scope of the embodiments.

Updates to the graph may be obtained from new versions of the graph (operation 502). For example, the new versions may include snapshots of the graph that are periodically generated during use of the social network by a set of users. If new versions of the graph are available, a new version of the graph is obtained (operation 504). For example, the new version may be obtained from a primary data store and/or "source of truth" for the graph as the new version is made available. A static representation of the graph is then replaced with the new version (operation 506). For example, the new version may be written over the static representation in storage on the computer system.

If new versions of the graph are not available, the computer system may be used as the primary data store for the graph. As a result, a dynamic representation of changes to the graph since the static representation was created is merged into the static representation (operation 508) instead of replacing the static representation with a new version of the graph. Once the static representation has been updated from either the new version or the dynamic representation, the dynamic representation is discarded (operation 510).

Figure 6:
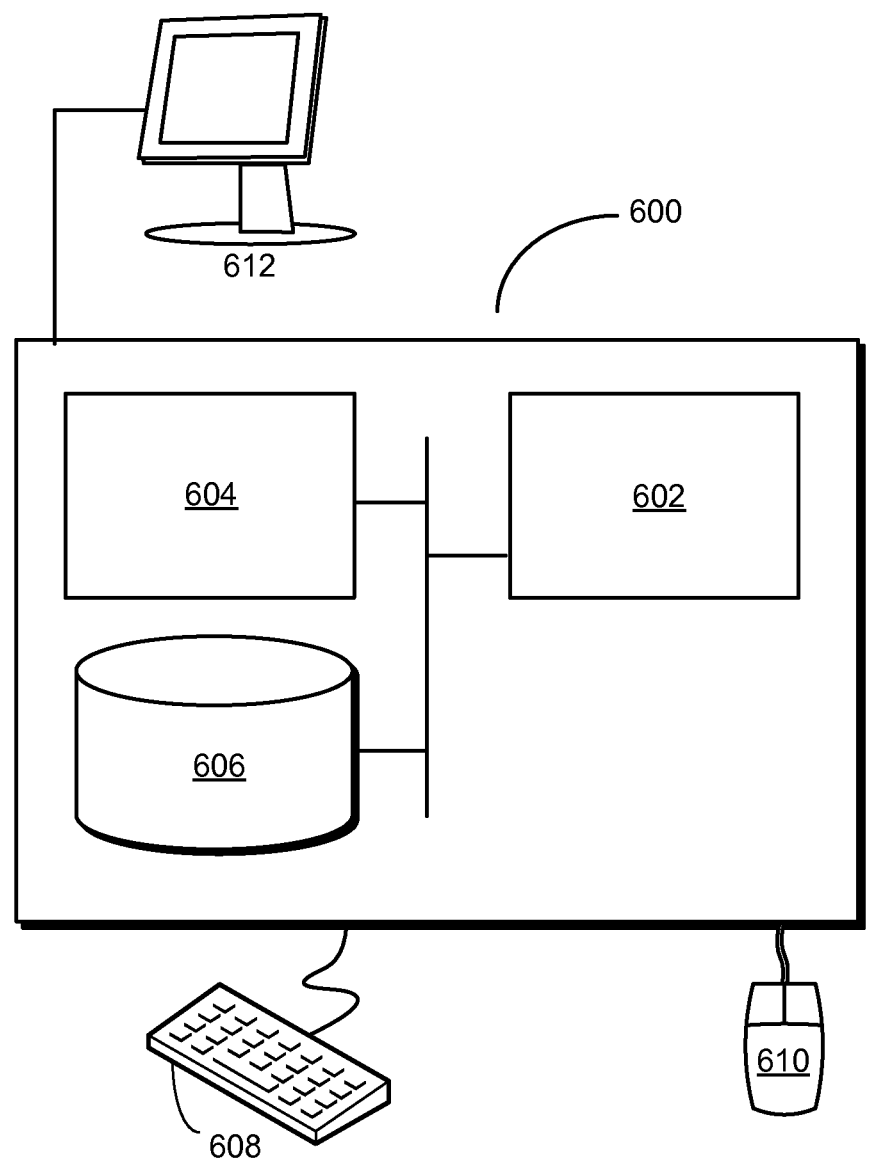
FIG. 6 shows a computer system in accordance with the disclosed embodiments.

FIG. 6 shows a computer system 600 in accordance with an embodiment. Computer system 600 includes a processor 602, memory 604, storage 606, and/or other components found in electronic computing devices. Processor 602 may support parallel processing and/or multi-threaded operation with other processors in computer system 600. Computer system 600 may also include input/output (I/O) devices such as a keyboard 608, a mouse 610, and a display 612.

Computer system 600 may include functionality to execute various components of the present embodiments. In particular, computer system 600 may include an operating system (not shown) that coordinates the use of hardware and software resources on computer system 600, as well as one or more applications that perform specialized tasks for the user. To perform tasks for the user, applications may obtain the use of hardware resources on computer system 600 from the operating system, as well as interact with the user through a hardware and/or software framework provided by the operating system.

In one or more embodiments, computer system 600 provides a system for processing data. The system may include a management apparatus that obtains a graph of a social network and stores a static representation of the graph on a single computer system (e.g., computer system 600). The management apparatus may also maintain a dynamic representation of changes made to the graph since the creation of the static representation in memory on the computer system. The system may also include a query-processing apparatus that uses the static and/or dynamic representations to process one or more queries of the graph.

In addition, one or more components of computer system 600 may be remotely located and connected to the other components over a network. Portions of the present embodiments (e.g., query-processing apparatus, management apparatus, online professional network data, etc.) may also be located on different nodes of a distributed system that implements the embodiments. For example, the present embodiments may be implemented using a cloud computing system that performs complex querying of a graph of online professional network data for a set of users on a set of remote computer systems.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method for processing data, comprising:
obtaining a graph of a social network, wherein the graph comprises:
a set of nodes representing users in the social network; and
a set of edges representing relationships between pairs of the users;
storing, on a single computer system instead of a cluster-based query-processing system that includes multiple computers, a static representation of the graph, wherein the static representation comprises:
a first set of fixed-size blocks representing the nodes and the edges; and
a first index that maps a set of identifiers for the nodes and the edges to offsets of the first set of fixed-size blocks;
identifying, from a stream of events associated with activity in the social network, updates to the graph that occurred subsequent to creation of the static representation;
storing, in a memory of the single computer system, a dynamic representation of the identified changes to the graph, wherein the dynamic representation comprises:
a second set of fixed-size blocks representing changes to the nodes and edges caused by the updates to the graph; and
a second index that maps a subset of the identifiers for the nodes and the edges to offsets of the second set of fixed-size blocks; and
using the dynamic representation and the static representation of the graph to process, by the single computer system, one or more queries of the graph by, for each of one or more identifiers in the query:
using the second index to match the identifier to an offset to one or more blocks in the second set of fixed-size blocks that match the query; and
when the second index does not contain the identifier, using the first index to match the identifier to an offset to one or more blocks in the first set of fixed-size blocks that match the query.

2. The method of claim 1, further comprising:
storing the dynamic representation in one or more files on the single computer system prior to a restart of the single computer system; and
after the restart, loading the dynamic representation from the one or more files into the memory.

3. The method of claim 1, further comprising:
periodically merging the dynamic representation into the static representation.

4. The method of claim 3, wherein merging the dynamic representation into the static representation comprises:
for each block in the second set of fixed-size blocks:
identifying a block in the first set of fixed-size blocks that corresponds to the block in the second set of fixed-size blocks; and
replacing the block in the first set of fixed-size blocks with the block in the second set of fixed-size blocks; and
discarding the dynamic representation.

5. The method of claim 3, wherein said periodically merging the dynamic representation into the static representation of the graph enables the single computer system to be used as a primary data store instead of as a mechanism for serving data duplicated from the primary data store.

6. The method of claim 1, further comprising:
obtaining a new version of the graph;
updating the static representation of the graph with the new version; and
discarding the dynamic representation after the static representation is updated.

7. The method of claim 1, wherein the first set of fixed-size blocks comprises a contiguous subset of fixed-size blocks corresponding to active users in the social network.

8. The method of claim 1, wherein the graph is obtained as a snapshot from a primary data store.

9. The method of claim 1, wherein at least a portion of the static representation of the graph is stored in one or more solid-state drives (SSDs) in the single computer system.

10. The method of claim 1, wherein a fixed-size block in the first set of fixed-size blocks comprises:
an adjacency list of a set of edges from a node to other nodes in the graph; and
one or more attributes associated with the set of edges.

11. An apparatus, comprising:
a single computer system having one or more processors; and
memory storing instructions that, when executed by the one or more processors, cause the apparatus to:
obtain a graph of a social network, wherein the graph comprises:
a set of nodes representing users in the social network; and
a set of edges representing relationships between pairs of the users;
store a static representation of the graph, wherein the static representation comprises:
a first set of fixed-size blocks representing the nodes and the edges; and
a first index that maps a first set of identifiers for the nodes and the edges to offsets of the first set of fixed-size blocks;
identify, from a stream of events associated with activity in the social network, updates to the graph that occurred subsequent to creation of the static representation;
store, in the memory, a dynamic representation of the identified changes to the graph, wherein the dynamic representation comprises:
a second set of fixed-size blocks representing changes to the nodes and edges caused by the updates to the graph; and
a second index that maps a subset of the identifiers for the nodes and the edges to offsets of the second set of fixed-size blocks; and
use the dynamic representation and the static representation of the graph to process one or more queries of the graph by, for each of one or more identifiers in the query:
using the second index to match the identifier to an offset to one or more blocks in the second set of fixed-size blocks that match the query; and
when the second index does not contain the identifier, using the first index to match the identifier to an offset to one or more blocks in the first set of fixed-size blocks that match the query.

12. The apparatus of claim 11, wherein the memory further stores instructions that, when executed by the one or more processors, cause the apparatus to:
store the dynamic representation in one or more files on the single computer system prior to restarting the apparatus; and
after the apparatus has restarted, load the dynamic representation from the one or more files into the memory.

13. The apparatus of claim 11, wherein the memory further stores instructions that, when executed by the one or more processors, cause the apparatus to:
periodically merge the dynamic representation into the static representation;
wherein said periodically merging the dynamic representation into the static representation of the graph enables the single computer system to be used as a primary data store instead of as a mechanism for serving data duplicated from the primary data store.

14. The apparatus of claim 11, wherein the memory further stores instructions that, when executed by the one or more processors, cause the apparatus to:
obtain a new version of the graph;
update the static representation of the graph with the new version; and
discard the dynamic representation after the static representation is updated.

15. The apparatus of claim 11, wherein the first set of fixed-size blocks comprises a contiguous subset of fixed-size blocks corresponding to active users in the social network.

16. A system, comprising:
a management non-transitory computer-readable medium comprising instructions that, when executed by one or more processors, cause the system to:
obtain a graph of a social network, wherein the graph comprises:
a set of nodes representing users in the social network; and
a set of edges representing relationships between pairs of the users; and
store a static representation of the graph, wherein the static representation comprises:
a first set of fixed-size blocks representing the nodes and the edges; and
a first index that maps a set of identifiers for the nodes and the edges to offsets of the first set of fixed-size blocks;
identify, from a stream of events associated with activity in the social network, updates to the graph that occurred subsequent to creation of the static representation;
maintain a dynamic representation of the identified changes to the graph, wherein the dynamic representation comprises:

a second set of fixed-size blocks representing changes to the nodes and edges caused by the updates to the graph; and a second index that maps a subset of the identifiers for the nodes and the edges to offsets of the second set of fixed-size blocks; and a query-processing non-transitory computer-readable medium comprising instructions that, when executed by one or more processors, cause the system to use the dynamic representation and the static representation of the graph to process one or more queries of the graph by, for each of one or more identifiers in the query:

using the second index to match the identifier to an offset to one or more blocks in the second set of fixed-size blocks that match the query; and when the second index does not contain the identifier, using the first index to match the identifier to an offset to one or more blocks in the first set of fixed-size blocks that match the query.

17. The system of claim 16, wherein a fixed-size block in the first set of fixed-size blocks comprises:

an adjacency list of a set of edges from a node to other nodes in the graph; and one or more attributes associated with the set of edges.

18. The system of claim 16, wherein one or both of the first set of fixed-size blocks and second set of fixed-size blocks comprise a contiguous subset of blocks corresponding to active users in the social network.

19. The system of claim 16, wherein the management non-transitory computer-readable medium further comprises instructions that, when executed by one or more processors, cause the system to:

periodically merge the dynamic representation into the static representation;

wherein said periodic merging of the dynamic representation into the static representation enables the single computer system to be used as a primary data store instead of as a mechanism for serving data duplicated from the primary data store.

20. The system of claim 19, wherein merging the dynamic representation into the static representation comprises:

for each block in the second set of fixed-size blocks:

identifying a block in the first set of fixed-size blocks that corresponds to the block in the second set of fixed-size blocks; and replacing the block in the first set of fixed-size blocks with the block in the second set of fixed-size blocks; and discarding the dynamic representation.

* * * * *